United States Patent [19]

Nagashima et al.

[11] Patent Number: 4,932,015
[45] Date of Patent: Jun. 5, 1990

[54] METHOD OF REPRODUCING SIGNALS FROM OPTICAL DISK

[75] Inventors: Michiyoshi Nagashima, Hirakata; Yoshinari Takemura, Osaka, both of Japan

[73] Assignee: Matsushita Electric Corp., Ltd., Osaka, Japan

[21] Appl. No.: 50,427

[22] Filed: May 18, 1987

[30] Foreign Application Priority Data

May 20, 1986 [JP] Japan .................. 61-115256

[51] Int. Cl.$^5$ .............................................. G11B 7/00
[52] U.S. Cl. .................. 369/44.11; 369/109; 369/124
[58] Field of Search ............ 369/44, 46, 109, 111, 369/113, 124

[56] References Cited

U.S. PATENT DOCUMENTS

| | | | |
|---|---|---|---|
| 4,310,916 | 1/1982 | Dil | 369/275 |
| 4,569,038 | 2/1986 | Nagashima | 369/44 |
| 4,589,103 | 5/1986 | Tajima | 369/46 |
| 4,674,070 | 6/1987 | Tajima | 369/275 |

OTHER PUBLICATIONS

"TeO$_x$ Thin Films for An Optical Disc Memory", Mutsuo Takenaga et al., J. Appl. Phys., vol. 54, No. 9, Sep. 1983, pp. 5376–5380.

*Primary Examiner*—Steven L. Stephan
*Attorney, Agent, or Firm*—Stevens, Davis, Miller & Mosher

[57] ABSTRACT

A method of reproducing signals formed in slant surfaces of a V-shaped track groove formed in an optical disk. The beam reflected from each slant surface has a portion having a small crosstalk component and a portion having a large crosstalk component, the portions existing separately. The beam reflected from the V-shaped track groove is detected by a photodetector which is composed of two photodetector units. Thus, the output from the first photodetector unit has a small crosstalk component, while the output from the second photodetector unit has a large crosstalk component. The reproduced signal is obtained by subtracting, from a signal formed by amplifying the output of the first photodetector unit, a signal formed by amplifying the output of the second photodetector unit, so that the crosstalk component in the signal from the first photodetector unit is negated by the crosstalk component in the signal from the second photodetector unit, so that the reproduced signal can have a reduced crosstalk component. At the same time, the strictness of requirement for design and positional accuracy of the photodetector is reduced. It is also to arrange such that signals are simultaneously and independently reproduced from adjacent slant surfaces of the V-shaped track groove by a single laser beam spot.

1 Claim, 8 Drawing Sheets

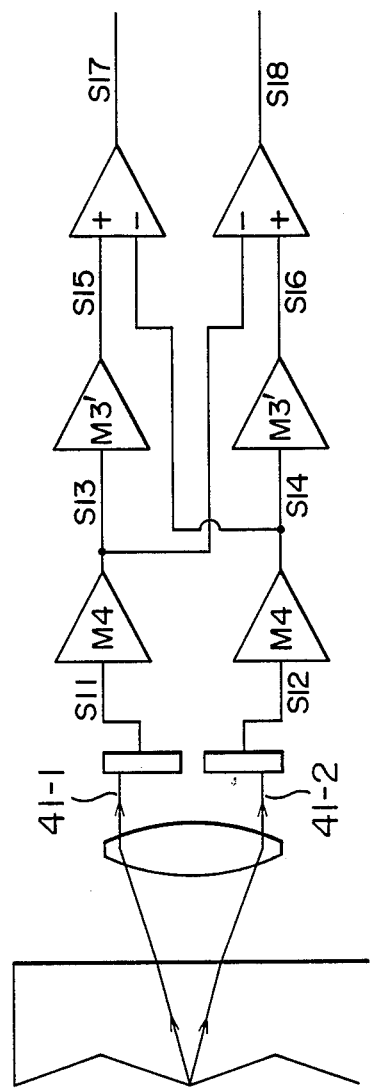
F I G. 14

METHOD OF REPRODUCING SIGNALS FROM OPTICAL DISK

BACKGROUND OF THE INVENTION

The present invention relates to a method of reproducing or reading, by means of a laser beam, signals which have been recorded in an optical disk.

A method has been proposed in the specification of U.S. Pat. No. 4,569,038 for recording data at a high density in an optical disk, by making use of V-shaped track grooves. More specifically, in this proposed method, a V-shaped track groove having slant side surfaces is formed in an optical disk at a pitch which is substantially the same as the pitches of recording tracks in conventional optical disks. In this method, signals are recorded in both slant side surfaces so that the recording density is substantially doubled. In the reproduction of the recorded signals, the beam portion reflected by the optical disk is received by a photodetector. However, the reproducing device does not reproduce whole the reflected beam but only the peripheral portion of the reflected beam. By suitably selecting the reproduction region in the beam, it is possible to reduce any crosstalk from the adjacent slant side surface of the V-shaped track groove. This is one of advantageous features offered by the V-shaped track groove. The reflected beam involves not only a reproduction with small crosstalk component but also a region which has a large crosstalk component though the light quantity is small. Therefore, the reproduction of signal is preferably conducted by means of a photodetector which is capable of reproducing signals only in the region having small crosstalk component. In order to obtain a sufficiently low level of crosstalk, e.g., −36 dB, it is necessary to ensure a high degree of accuracy not only in design but also in installation of the photodetector.

SUMMARY OF THE INVENTION

As stated before, a light beam reflected from each slant side surface of the V-shaped track groove has a portion having a small crosstalk component and a portion having a large crosstalk component, these portions existing separately from each other. According to the invention, the photodetector for receiving the beam reflected by the optical disk is composed of a first photodetector and a second photodetector. More specifically, the first photodetector is designed for receiving the reflected beam portion having the small crosstalk component, while the second photodetector is adapted for receiving the reflected beam portion having the large crosstalk component. The signal derived from the first photodetector is multiplied with an amplification $M_1$, while the signal derived from the second photodetector is multiplied with an amplification $M_2$. The output of the second photodetector after multiplication by $M_2$ is substracted from the output of the first photodetector after multiplication by $M_1$ and the difference is used as the reproduction signal. Usually, the magnification factor $M_1$ is greater than the amplification factor $M_2$. By subtracting the crosstalk component from the amplified output of the second photodetector from the crosstalk component of the magnified output of the first photodetector, it is possible to obtain a reproduction signal with reduced crosstalk component while reducing the strictness of the requirement for higher accuracy of design and installation of the photodetector. It is to be noted also that the method of the present invention enables independent reproduction of signals from both slant side surfaces of a V-shaped groove simultaneously by means of a single laser beam.

BRIEF DESCRIPTION OF THE DRAWINGS

FIG. 14 is a schematic illustration showing the manner in which signals are processed in the second embodiment of the present invention;

DESCRIPTION OF THE PREFERRED EMBODIMENTS

A description will be made first as to the method of forming a V-shaped track groove in an optical disk. The V-shaped track groove is formed by mechanically cutting a copper disk by means of a diamond stylus having a V-shaped point while rotating the cooper disk. For instance, the v-shaped point of the diamond stylus has an apex angle of 162° and the stylus is moved radially inwardly by about 1.65 μm per each rotation of the copper disk. In consequence, a mother disk is formed in which a V-shaped spiral track groove, defined by opposing slant surfaces which make an angle of 162° therebetween, is formed at a pitch of 1.65 μm. It is possible to form a stamper and a replica by making use of this mother disk. This method is disclosed also in the specification of U.S. Pat. No. 4,569,038.

Figure 1:
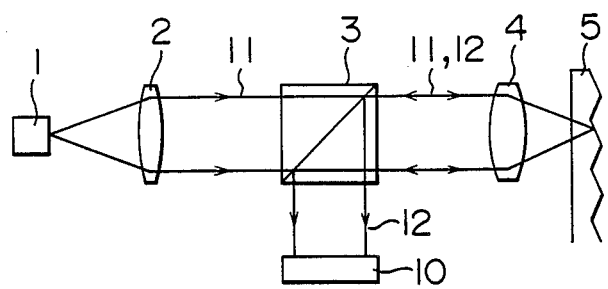
FIG. 1 is an illustration of basic elements of an optical system including an optical disk.

Major components of the optical system for reproducing signals from the V-shaped track groove are shown in FIG. 1. The optical system includes a semiconductor laser 1, a coupling lens 2, a beam splitter 4, an objective lens 4, the V-shaped track groove 5, and a reproducing photodetector 10. Incidence light beam and reflected light beam are designated by numerals 11 and 12, respectively.

Figure 2:
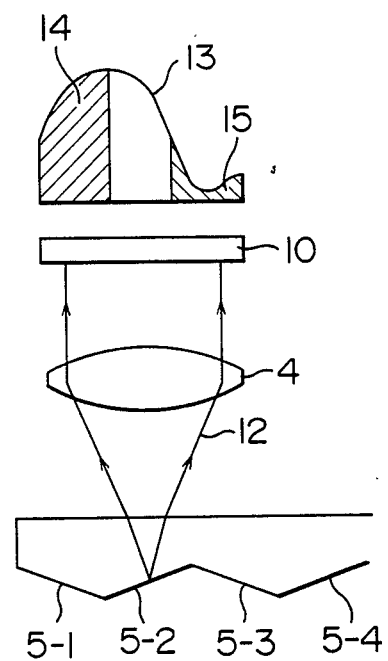
FIG. 2 is an illustration of a beam reflected from a V-shaped track groove and the region in the reflected beam to be reproduced.
Figure 3:
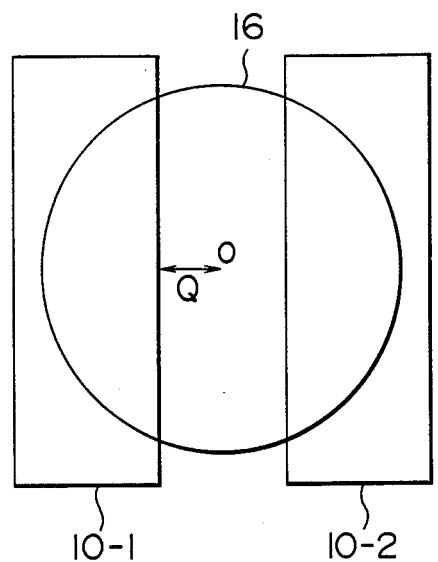
FIG. 3 is an illustration of a photodetector for reproducing signals recorded in a V-shaped track groove.

The laser beam from the semiconductor laser 1 is changed into a parallel beam by the coupling lens 2 and is made to pass through the beam splitter. The beam is then converged by the objective lens so as to focus on the disk. In order to make the features of the V-shaped track groove to be understood clearly, FIG. 1 lacks any illustration of controlling optical system. The specification of U.S. Pat. No. 4,569,038 also disclosed a method of reproducing signals from the slant surfaces of the V-shaped track groove. FIG. 2 illustrates only the beam reflected from a slant surface of a V-shaped track groove. In this Figure, slant surfaces of V-shaped track grooves are denoted by numerals 5-1, 5-2, 5-3 and 5-4. A curve 13 shows the distribution of intensity of the reflected beam as received by the photodetector. Not all of this reflected beam but only a peripheral region, e.g., hatched region 14, is reproduced. As explained before, it is one of the critical features of the V-shaped track groove that the crosstalk from the adjacent slant surface is diminished by suitable selection of the region to be reproduced. The region opposite to the peripheral region 14, e.g., the hatched area 15, is the region which has a large crosstalk component. It is another feature of the V-shaped track groove that each reflected beam includes separate portions: namely, a portion having a small crosstalk component and a portion having a large crosstalk component but of a small light quantity. The reproduction of the signal from the reflected beam therefore essentially necessitates a photodetector of split type composed of two photodetector units 10-1 and 10-2 as shown in FIG. 3. More specifically, the photodetector used for the reproduction has first and second photodetector units and which are arranged in symmetry with each other with respect to a line which passes through the center of the reflected light beam and parallel to the track. The first photodetector unit receives a beam portion which has a small crosstalk component, while the second photodetector unit receives a beam portion which has large crosstalk component though the light quantity thereof is small. It is to be understood that, for the purpose of reproducing signals from the beam reflected by the slant surfaces 5-1, 5-3 and so forth, the photodetector unit 10-1 is used as the first photodetector unit, while the photodetector unit 10-2 is used as the second photodetector unit, whereas, when the signals from the slant surfaces 5-2, 5-4 and so forth are reproduced, the photodetector units 10-2 and 10-1 are used, respectively, as the first and the second photodetector units. In FIG. 3, a reference numeral 16 designates a circle having the same diameter as the reflected beam.

Figure 4:
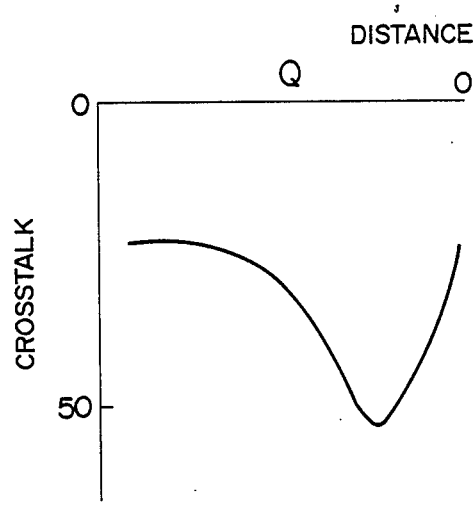
FIG. 4 is an illustration of the relationship between the reproduced region and crosstalk component.

FIG. 4 shows the amount of crosstalk along the distance Q (see FIGS. 2 and 3) between the center axis of the reflected beam and the reproduction boundary. It is assumed here that the incidence light to the objective lens 4 has a Gaussian distribution pattern and that a portion of the reflected beam having the central intensity above 1/e is converged through the objective lens. In the case of a variable-density recording in which the signals are recorded in the form of variations in reflection factors the distance Q at which the crosstalk is reduced is about ¼ of the diameter of the reflected beam. The variable-density recording is made possible by forming a TeOx recording film on the V-shaped track groove. For the detail of the TeOx recording film, reference is made to M. Takenaga et al., J. Appln. Phys. No. 54 (1983) p.5376. In case of the pit-type recording in which signals are recorded in the form of pits, the distance Q at which the crosstalk is sufficiently reduced is about 1/10 of the diameter of the reflected beam. The value of the distance Q, however, will be increased when the intensity of the incident beam coming into the objective lens 4 has a uniform intensity distribution. In order to reduce the crosstalk to a sufficiently low level, e.g., down to −40 dB, it is necessary that the photodetector units 10-1 and 10-2 are accurately designed, fabricated and installed. Accuracy is required also for the distance Q shown in FIG. 3.

Figure 5:
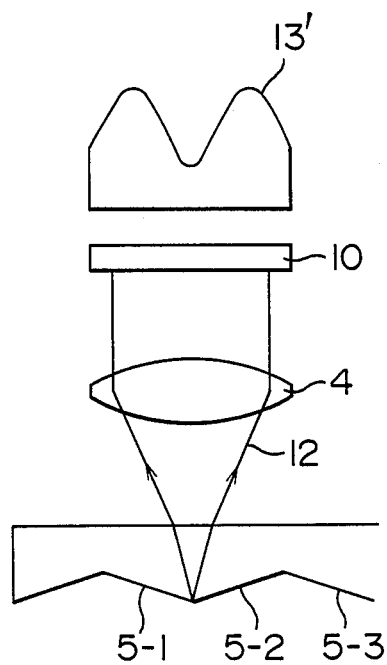
FIG. 5 is an illustration of a beam reflected by the bottom of a V-shaped track groove.

The arrangement may be such that the laser beam spot tracks the bottom of the V-shaped track groove. FIG. 5 shows the beam reflected from the bottom of the V-shaped track groove. In this case, the reflected beam is distributed along a curve 13'. When this beam is detected by the detector shown in FIG. 3, the signals from the slant surface 5-1 is received mainly by the photodetector unit 10-2, whereas the signals from the slant surface 5-2 is received mainly by the photodetector unit 10-1. Both the signals received by the photodetector units 10-1 and 10-2 have large crosstalk components. In this case, it is impossible to reduce the crosstalk even though the accuracy of the photodetector shown in FIG. 3 is increased. The tracking along the bottom of the V-shaped track groove, however, will be advantageous is any method is available for allowing independent reproduction of signals from both slant surfaces simultaneously, with the use of a single laser beam spot. In such a case, a single signal of a high quality is divided into two portions which are recorded in opposing slant surfaces, respectively, such that these two portions of the signal are simultaneously reproduced by a single laser beam spot.

As stated before, the beam reflected from the slant surface of the V-shaped track groove has two separate portions: namely, a portion having a small crosstalk component and a portion having a small crosstalk component. By making an efficient use of this feature, the present invention proposes a method which can reduce the strictness for the requirement for accuracy of the design and installation of the photodetector. Such a method also enables signals from two slant surfaces of the same V-shaped track groove by means of a single laser beam. According to this method, the beam reflected by a V-shaped track groove is reproduced by means of a photodetector of a split type having first and second photodetector units. The first photodetector unit produces a detection signal having a small crosstalk component, while the second photodetector unit produces a detection signal having a large crosstalk component. A signal obtained by amplifying the output of the second photodetector unit is subtracted from a signal obtained by amplifying the output of the first photodetector unit, thus determining the difference which is used as the reproduction signal. According to this method, the crosstalk component involved by the signal output from the first photodetector unit is negated by the crosstalk component of the output from the second photodetector unit, so that a signal of reduced crosstalk component is obtained while reducing the strictness of the requirement for design and installation of the photodetector. In addition, it becomes possible to simultaneously and independently reproduce signals from both slant surfaces of the same V-shaped track groove by means of a single laser beam.

EMBODIMENT 1

Figure 6:
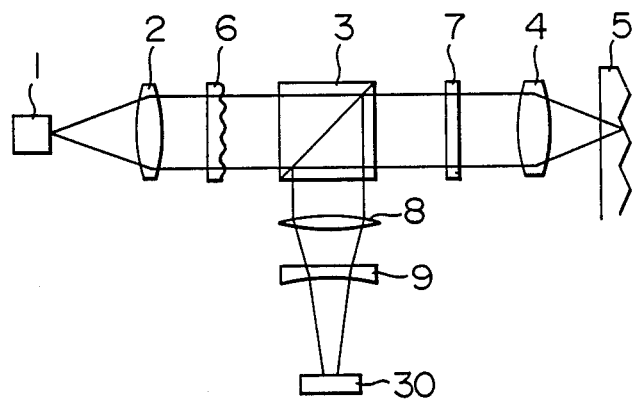
FIG. 6 is an illustration of an optical system incorporated in a first embodiment of the present invention.
Figure 7:
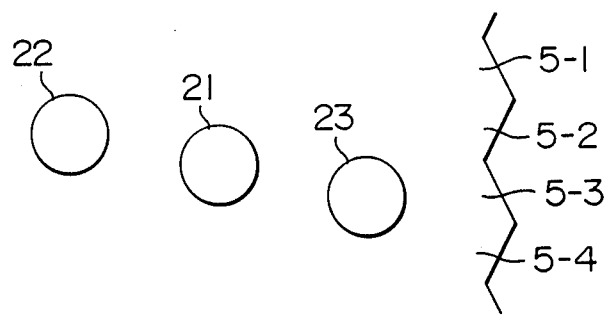
FIG. 7 is an illustration of a laser beam spot on an optical disk used in the embodiment shown in FIG. 6.
Figure 8:
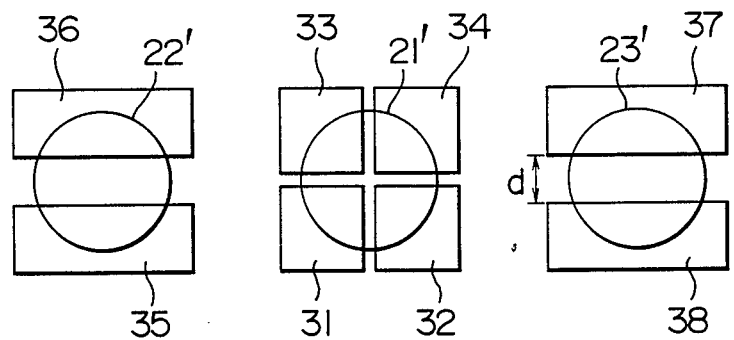
FIG. 8 is an illustration of a photodetector incorporated in the first embodiment of the invention.

FIG. 6 shows an optical system which is incorporated in the first embodiment of the present invention. The optical system includes a diffraction grating 6, a quarter-wave plate 7, a lens system 8, 9 for effecting astigmatic focus control, and a photodetector 30. Other components which are the same as those used in the optical system shown in FIG. 1 are denoted by the same reference numerals as those in FIG. 1. The pitch of the V-shaped track groove, i.e., the spacing between the adjacent crests, is 1.65 µm, whereas the angle formed between two slant surfaces is 162°. The wavelength of the laser beam used is 780 nm, while the NA of the objective lens is 0.6. FIG. 7 shows laser beam spots positioned on the disk. These three spots 21, 22 and 23 are formed by being converged by the objective lens 4 after the beams are formed by splitting the beams from the same semiconductor laser by means of the diffraction grating 6. The quarter-wave plate 7 is provided for the purpose of ensuring efficient splitting of the incidence beam and the reflected beam by means of the beam splitter 3. As shown in FIG. 8, the photodetector 30 is composed for eight sections. The beams reflected from the spots 21, 22 and 23 are received by the photodetector as at 21', 22' and 23', respectively. The spot 21 is restricted by the crest or valley of the V-shaped track groove, and the focus control and tracking control by the respective photodetector units 31 to 34 are effected by making use of the reflected beam 21'. More specifically, the focus control is effected in accordance with a signal which is obtained by subtracting the sum of output of the photodetector units 32 and 33 from the sum of the outputs from the photodetector units 31 and 34, while the tracking control is effected in accordance with a signal which is obtained by subtracting the sum of the outputs of the photodetector units 33 and 34 from the sum of the outputs of the photodetector units 31 and 32. The spots 22 and 23 are aimed on the centers of the adjacent slant surfaces of the V-shaped track groove, and the beams reflected therefrom include the signals to be reproduced. Photodetector units 35, 36 and photodetector units 37, 28, respectively, correspond to the photodetector units 10-1 and 10-2 of the photodetector shown in FIG. 3.

It is assumed here that the signals are to be reproduced from the slant surface 5-2. In this case, the signal S1 from the photodetector 35 has a small crosstalk, whereas the signal S2 from the photodetector unit 36 has a large crosstalk component although the light quantity of this signal S2 is small.

Figure 9:
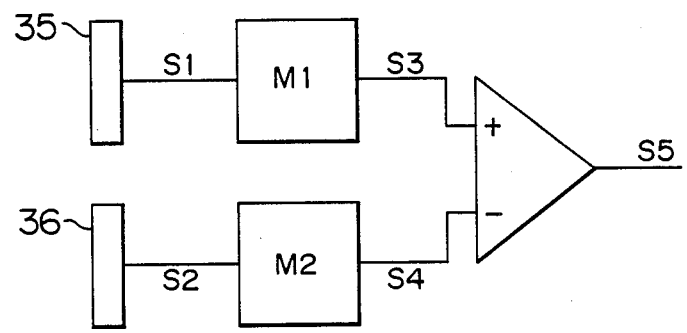
FIG. 9 is an illustration of the way in which signals are formed in the first embodiment of the invention.

According to the invention, the reproduction system includes the following additional function. Namely, means are provided as shown in FIG. 9 for subtracting a signal S4 obtained by amplifying the signal S2 by an amplification factor $M_2$ from a signal S3 obtained by amplifying the signal S1 by a multiplication factor $M_1$. By suitably selecting the amplification factors $M_1$ and $M_2$, it is possible to obtain a signal S5 having a very small crosstalk component.

Figure 10A:
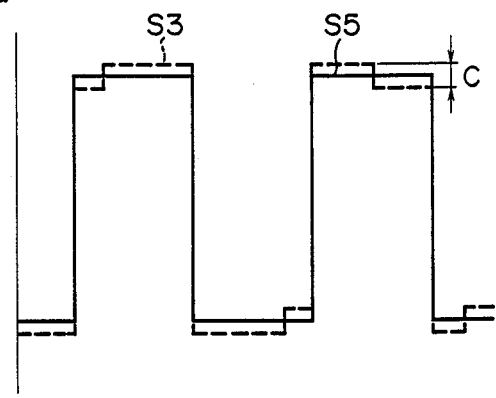
FIGS. 10a and 10b are illustrations of reproduction signals employed in the first embodiment of the invention.
Figure 10B:
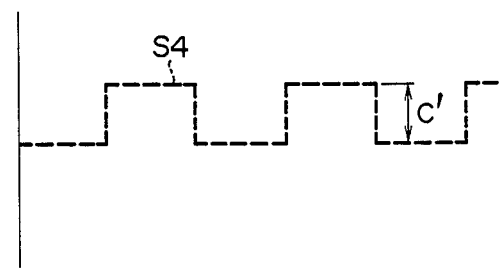

Examples of such signal S3, S4 and S5 are shown in FIGS. 10a and 10b. The signal S3 itself can have a high quality provided that the distance d (d=2Q) between the photodetector units shown in FIG. 8 and the positions of the photodetector units are set accurately. Namely, it is possible to reduce the crosstalk component C shown in FIG. 10a. The crosstalk component C of the signal S3 may be increased to an unacceptable level if the designs of the photodetector units and the positions of the photodetector units are not set accurately. However, according to the invention, the crosstalk component C' of the signal S4 is subtracted from the crosstalk component C of the signal S3, so that the resultant signal S5 has a very small crosstalk component. It is thus possible to obtain the signal S5 which has so small a crosstalk component that it can be satisfactorily used as the reproduced signal, even though the signal S3 itself has a large crosstalk component. At the same time, the requirement of strictness for the design of the photodetector, e.g., the distance d shown in FIG. 3, and the positions of the photodetector units can be reduced advantageously. For instance, when the level of the crosstalk component of the signal S1 is 30 dB (about 1/30) while the level of the crosstalk component of the signal S2 is 1/10 of the signal S1, the crosstalk component of the signal S5 can be reduced to a satisfactorily low level by setting the amplification factors $M_1$ and $M_2$ to be 100 and 30, respectively. It will be clear to those skilled in the art that the same advantage can be obtained also when the signals are reproduced from the slant surface 5-3, by subtracting a signal obtained by amplifying the output of the photodetector unit 38 from a signal obtained by amplifying the output of the photodetector unit 37. Embodiment 2

Figure 11:
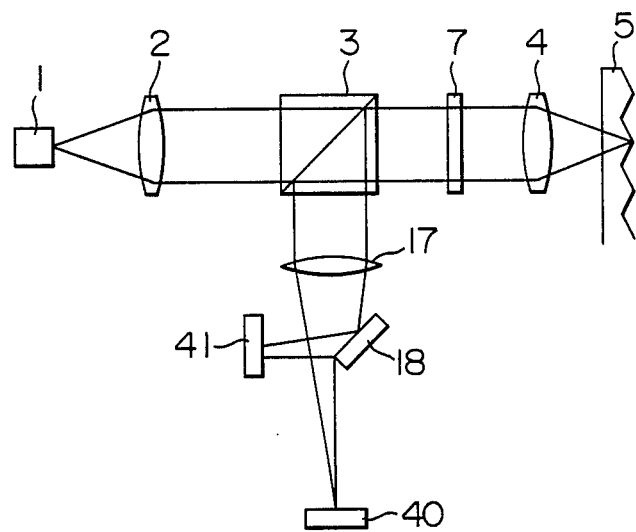
FIG. 11 is an illustration of an optical system employed in a second embodiment of the present invention.
Figure 12:
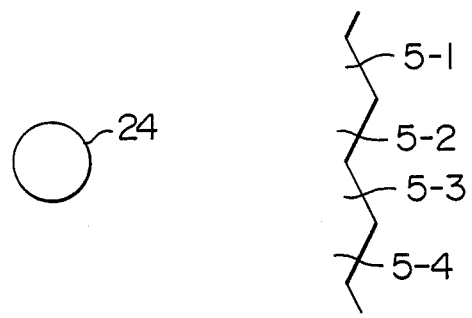
FIG. 12 is an illustration of a laser beam spot on an optical disk used in the second embodiment of the invention.
Figure 13:
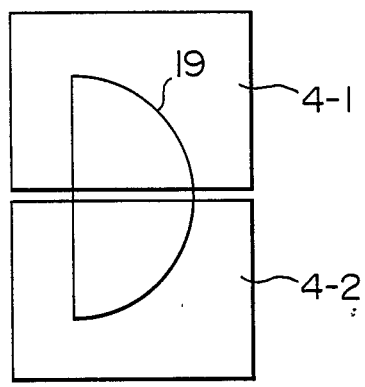
FIG. 13 is an illustration of a photodetector incorporated in the second embodiment of the invention.

FIG. 11 shows an optical system which is incorporated in a second embodiment of the present invention. This optical system is designed for independently and simultaneously reproducing signals from both slant surfaces of a common V-shaped track groove, by applying the laser beam spot to the valley or bottom of the V-shaped track groove. In this Figure, the same reference numerals are used to denote the same parts or members as those used in the optical systems shown in FIGS. 1 and 6. The shape of the V-shaped track groove, NA of the objective lens and the wavelength of the laser beam are the same as those used in the first embodiment. In this second embodiment, a lens 17 and a mirror 18 are used in combination so as to effect a focus control by a method generally referred to as "knife edge method", by making use of a split-type photodetector 40. On the other hand, the tracking control is conducted by a method generally referred to as "far-sight image push-pull method", by making use of a photodetector 41. Both these methods are well known and, hence, are not detailed in this specification. The tracking control is conducted to allow the laser beam spot to follow the bottom of the V-shaped track groove as shown in FIG. 12. FIG. 13 shows the detail of the photodetector 41 together with the reflected beam 19. The photodetector 41 is split into two units: namely, a unit 41-1 and 41-2. The beam received by each photodetector unit is mainly constituted by signals derived from each slant surface. However, the beam also carries a large crosstalk component so that it cannot be used as the reproduced signal. According to the experiment, the crosstalk component is on the order of −10 to −15 dB. The second embodiment of the invention, therefore, proposes a signal processing method which will be explained hereinunder with reference to FIG. 14. Signals output from the photodetector units 41-1 and 41-2 are denoted by S11 and S12, respectively. The signals S11 and S12 are amplified by amplification factor $M_4$ so as to become signals S13 and S14. The amplification factor 10 is about 10 or so. The signals S13 and S14 are further amplified by an amplification factor $M_3'$ so as to become signals S15 and S16. The product of the factors $M_4$ and M₃' is represented by M3. Then, signals S17 and S18 are obtained in accordance with the following formulae, and are used as the reproduced signals.

$$S17 = S15 - S14$$

$$S18 = S16 - S13$$

Thus, in the second embodiment of the present invention, each reproduction signal is obtained by subtracting, from a signal obtained by amplifying one of the outputs of the photodetector units 41-1 and 41-2 by an amplification factor M₃, a signal obtained by multiplying the output from the other photodetector units by a multiplication factor M₄.

Figure 16:
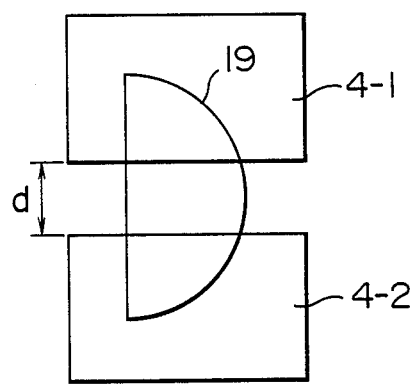
FIG. 16 is an illustration of another example of a photodetector incorporated in the second embodiment of the present invention.
Figure 15A:
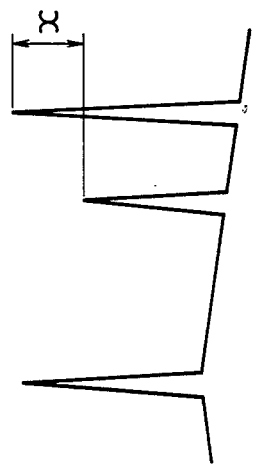
FIGS. 15a and 15b are illustrations of spectrums in the second embodiment of the present invention.
Figure 15B:
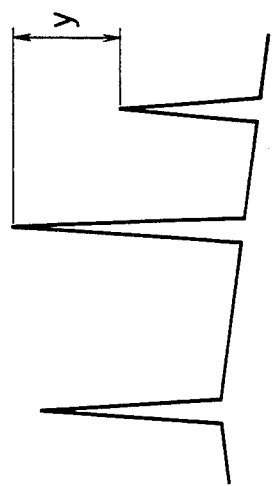

FIGS. 15a and 15b show the spectrums of the signals S15 and S16 obtained in an experiment which was conducted by making use of the photodetector of the type shown in FIG. 13. Crosstalk components represented by x and y are on the order of 10 to 15 dB. Therefore, the crosstalk components in the reproduced signals S17 and S18 can be reduced sufficiently if these signals are formed by using the amplification factor M₃' ranging between 3 and 4. It is true that the signal component to be reproduced also is reduced as a result of the subtracting operation. However, the amount of reduction of the signal component is about 1 dB or so which is negligibly small. The signals with small crosstalk component are concentrated to the peripheral region of the reflected beam. The photodetector shown in FIG. 16 is designed and situated to receive mainly the peripheral region of the beam. In this second embodiment, the distance d (d=2Q as seen from FIG. 16) between two photodetector units is selected to range between 20 and 40% of the diameter of the reflected beam. In the experiment conducted, the crosstalk components x and y (see FIGS. 15a and 15b) of the signals S13 and S14 were on the order of 16 to 20 dB and, therefore, it is understood that the crosstalk components of the reproduced signals S17 and S18 can be reduced satisfactorily if the amplification factor M₃' is selected to be about 10. According to the second embodiment, therefore, it is possible to independently and simultaneously reproduce signals from both slant surfaces of a V-shaped track groove by means of a single laser beam spot.

As will be understood from the foregoing description, the present invention offers the following advantages.

Namely, the photodetector for receiving the reflected beam is split into two parts: namely, first and second photodetector units. The reproduced signal is obtained by subtracting, from a signal obtained by amplifying the output of the first photodetector unit, a signal obtained by amplifying the output of the second photodetector unit, so that the crosstalk component in the reproduced signal is reduced remarkably. This in turn reduces the strictness of requirement for accuracy in the design and installation of the photodetector. It is to be noted also that the method of the invention makes it possible to independently and simultaneously reproduce signals from both slant surfaces of a V-shaped track groove by means of a single laser beam spot.

What is claimed is:

1. A method of reproducing, with reduced cross-talk, information signals which are recorded on an optical disk with a track groove having a V-shaped radial section defined by opposing slant surfaces, each of said slant surfaces carrying a respective information signal recorded therein, the reproduction being conducted by focusing a laser beam spot on said track groove in said optical disk and receiving a reflected beam by a photodetector, said method comprising the steps of:

focusing said laser beam spot on the crest or valley of a track groove;

receiving the reflected beam by first and second photodetector units;

amplifying outputs of said first and second photodetector units in respective first and second amplifying circuits;

determining a first reproduced information signal having reduced cross-talk for one of the slant surfaces of said groove by subtracting, from a signal obtained by amplifying the output of said first photodetector unit in said first amplifying circuit with a first amplification factor, a signal obtained by amplifying the output of said second photodetector unit in said second amplifying circuit with a second amplification factor, said first amplification factor being greater than said second amplification factor; and determining a second reproduced information signal having reduced cross-talk for the other slant surface of said groove by subtracting, from a signal obtained by amplifying the output of said second photodetector unit in said second amplifying circuit with a third amplification factor, a signal obtained by amplifying the output of said first photodetector unit in said first amplifying circuit with a fourth amplification factor, the third amplification being greater than said fourth amplification factor;

whereby recorded information signals having reduced cross-talk are simultaneously and independently reproduced from adjacent slant surfaces of a groove by a single laser beam spot.

* * * * *